UNITED STATES PATENT OFFICE.

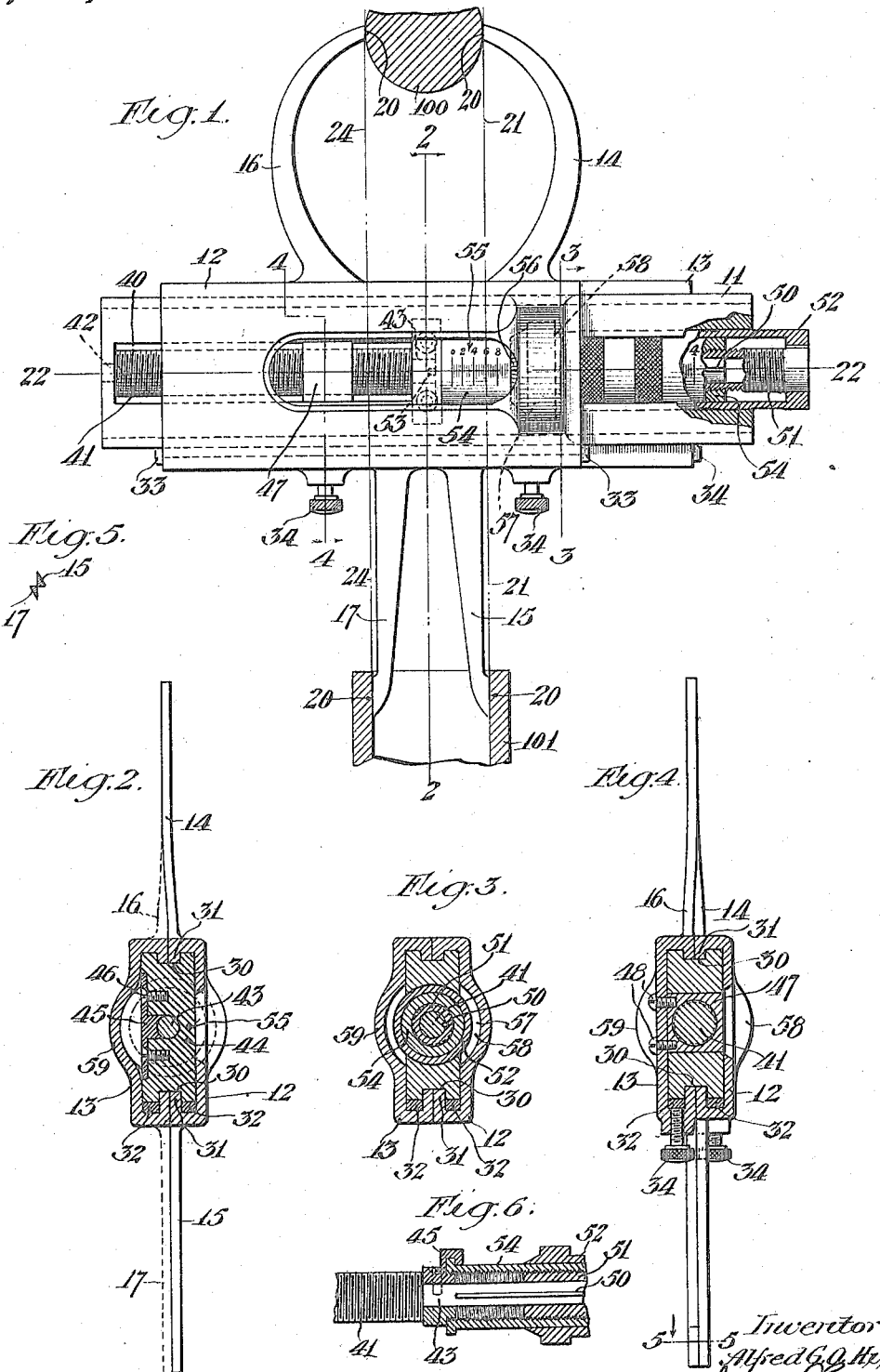

ALFRED G. O. HIX, OF LOS ANGELES, CALIFORNIA.

COMBINATION INSIDE AND OUTSIDE MICROMETER-CALIPERS.

1,269,932.　　　　　　　Specification of Letters Patent.　　Patented June 18, 1918.

Application filed July 12, 1917. Serial No. 180,228.

*To all whom it may concern:*

Be it known that I, ALFRED G. O. HIX, a citizen of the United States, residing at Los Angeles, in the county of Los Angeles and State of California, have invented a new and useful Combination Inside and Outside Micrometer-Calipers, of which the following is a specification.

My invention relates to the machinists' art, and more particularly to the measuring devices used in that art. It is often necessary for the machinist to measure accurately the thickness of materials or the diameter of a cylindrical surface or of a cylindrical cavity. Various types of micrometers have been developed for this purpose, these micrometers depending upon the accuracy of a screw for their operation. The micrometers which have been previously developed may be divided broadly into two classes, those which are adapted to measure the thickness of a material, commonly called outside micrometers, and those which are adapted to measuring openings, commonly called inside micrometers.

The principal object of my invention is to incorporate in a single instrument a combined inside and outside micrometer caliper. While such a device may be used for all the diverse purposes to which either an inside or outside caliper is adapted, it has in addition certain peculiar virtues of its own, due to the associations of the two instruments as a single unity. This will perhaps be better understood if a single application of such a caliper is described, and for this purpose I have selected, illustrated, and will describe one of the commonest uses to which such a caliper may be put. This particular application is the fitting of a cylindrical body into a cylindrical opening. This operation must be done whenever it is necessary to turn a shaft or bearing so that they will fit together. For convenience in description, the cylindrical body will be hereinafter referred to as the shaft, and the body having the cylindrical opening will be referred to as the bearing.

A further object of my invention is to provide a caliper which can be set to turn fits between shafts and bearings, a single setting serving to measure both the shaft and the bearing.

Further objects and advantages will be made evident hereinafter.

Referring to the drawings, which are for illustrative purposes only:

Figure 1 is a side elevation of the caliper, a portion thereof being broken away, and shown in section, to better illustrate the invention.

Fig. 2 is a section on a plane represented by the line 2—2 Fig. 1, this plane being viewed in the direction of the arrows.

Fig. 3 is a section on a plane represented by the line 3—3 Fig. 1.

Fig. 4 is a section on a plane represented by the line 4—4 Fig. 1.

Fig. 5 is a section on a plane represented by the line 5—5 of Fig. 4.

Fig. 6 is a partial section on a plane represented by the line 22—22 of Fig. 1.

In the form of my invention illustrated in the drawings, a bar 11 is provided on which slide a right hand slider 12 and a left hand slider 13. Formed on the right hand slider 12 are a right hand outside jaw 14 and a right inside jaw 15. Formed in a similar manner on the slider 13 are a left hand outside jaw 16 and a left hand inside jaw 17.

The jaws 14 and 15 are accurately ground so that the contact surfaces 20 thereof are in a straight line 21, which is at right angles to the axis 22 of the caliper. In the same manner, the jaws 16 and 17 are so ground that their contact surfaces 20 are in a straight line 24 at right angles to the axis 22 and parallel with the line 21.

The bar 11 is provided with grooves 30 in either edge in which projections 31 on the sliders 12 and 13 project. Keys 32 having heads 33 are provided in each of the sliders 12 and 13, these keys being clamped against the bar 11 by means of thumb screws 34. The bar 11 is provided with a central slot 40 in which a spindle 41 turns. This spindle is pivoted at one end on a conical pin 42 and is turned down as shown at 43 near its center to form a journal turning freely in a bearing 44 formed from the material of the bar 11. A bearing cap 45 is secured by screws 46 in the bar 11, as shown in Fig. 2. The left hand end of the spindle 41 is threaded as shown in Fig. 1, and is engaged by a nut 47 which is secured by means of screws 48 to the left hand slider 13. The rotation of the spindle 41, therefore, tends to move the slider 13 along the bar 11. The right hand portion of the spindle 41 is provided with a key 50 which slides in a threaded sleeve 51 rigidly secured in a calibration tube 52. The left hand end of the spindle 41 is provided with a left hand thread, and the sleeve 51 is provided with a right hand thread. A jacket 54 is rigidly secured, by means of pins 53, with relation to the bar 11, extending inside the calibration tube 52 and being threaded on the sleeve 51. The jacket is further secured by being locked under a projection on the bearing cap 45, as best shown in Fig. 6. Calibration markings 55 are provided on the jacket 54, and calibration markings 56 are provided on the edge of the calibration tube 52. The calibration tube 52 is provided with a cylindrical projection 57, which engages a projection 58 formed on the slider 12 and which slides freely in the direction of the axis 22 inside an elongated projection 59 formed on the slider 13.

The method of operation of my invention is as follows:

The thumb screws 33 being loosened up, the sliders 12 and 13 are free to slide on bar 11. For the purpose of so sliding them, the operator turns the calibration tube 52, the exterior of this tube being knurled to provide a good grip. The turning of the calibration tube 52 also turns the spindle 41, due to the key 50. As the jacket 54 is stationary, the turning of the calibration tube 52 moves it longitudinally along the axis 22, due to the threads on the sleeve 51 which turns inside the jacket 54. As the spindle 41 turns, the nut 47 moves along axis 22, thus moving the slider 13. At the same time, the movement of the calibration tube 52 along the axis 22 tends to move the slider 12 in the opposite direction, due to the projection 57 which fits inside the projection 58. The turning, therefore, of the calibration tube 52 causes the jaws 14 and 16 to approach or recede from each other, and the sliders 12 and 13 to move along the bar 11. Any movement of the jaws 14 and 16 is exactly duplicated by the jaws 15 and 17, and the interior distance between the jaws 14 and 16 is always exactly equal to the distance outside the jaws 16 and 17, the calibration markings 55 and 56 allowing this distance to be accurately determined. It is, therefore, possible to caliper outside the shaft shown at 100, and with the same setting to accurately caliper inside the bearing 101. By so doing, it is possible to turn the shaft 100 or bore out the bearing 101 to accurately fit upon the shaft. It is for the purpose of turning such fits that my caliper is especially designed.

While I have herein illustrated and described certain instrumentalities for carrying out my invention, it will be obvious to others skilled in the art to which it pertains, that numerous modifications and refinements thereof are possible without departing from the spirit of my invention.

I therefore desire it understood that all such changes are contemplated within the scope of my invention as expressed in the appended claims.

I claim as my invention:

1. A caliper comprising a bar; two sliders each engaging said bar and movable axially thereon; two caliper jaws each fixed to one of said sliders; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; means by which said sleeve actuates the right hand slider; and calibration means by which the separation between the jaws can be accurately determined.

2. A caliper comprising a bar; two sliders each engaging said bar and movable axially thereon; two caliper jaws each fixed to one of said sliders; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; a calibration tube fixed to said sleeve and projecting over said jacket; means by which said tube actuates the right hand slider; and calibration means by which the separation between the jaws can be accurately determined.

3. A caliper comprising a bar, two sliders each engaging said bar and movable axially thereon; two caliper jaws each fixed to one of said sliders; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; a calibration tube fixed to said sleeve and projecting over said jacket; means by which said tube actuates the right hand slider; and calibration markings on said jacket and the edge of said calibration tube.

4. A combined inside and outside caliper comprising a bar; two sliders each engaging said bar and movable axially thereon; two outside caliper jaws each fixed to the top of one of said sliders; two inside caliper jaws each fixed to the bottom of one of said sliders, the contact surfaces of the inside and the outside jaw of each slider being in the same straight line which is at right angles to the axis of the caliper; a spindle turning freely with relation to said bar but restrained to prevent axial movement with relation thereto; a nut fixed to the left hand slider and engaging a left hand thread on the left hand end of said spindle; means for rotating said spindle; right hand thread means operated in conjunction with the right hand end of said spindle; means by which said right hand thread means moves the right hand slider; and calibration means by which the separation between the jaws can be accurately determined.

5. A combined inside and outside caliper comprising a bar; two sliders each engaging said bar and movable axially thereon; two outside caliper jaws each fixed to the top of one of said sliders; two inside caliper jaws each fixed to the bottom of one of said sliders, the contact surfaces of the inside and outside jaw of each slider being in the same straight line which is at right angles to the axis of the caliper; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; means by which said sleeve actuates the right hand slider; and calibration means by which the separation between the jaws can be accurately determined.

6. A combined inside and outside caliper comprising a bar; two sliders each engaging said bar and movable axially thereon; two outside caliper jaws each fixed to the top of one of said sliders; two inside caliper jaws each fixed to the bottom of one of said sliders, the contact surfaces of the inside and the outside jaw of each slider being in the same straight line which is at right angles to the axis of the caliper; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; a calibration tube fixed to said sleeve and projecting over said jacket; means by which said tube actuates the right hand slider; and calibration means by which the separation between the jaws can be accurately determined.

7. A combined inside and outside caliper comprising a bar; two sliders each engaging said bar and movable axially thereon; two outside caliper jaws each fixed to the top of one of said sliders; two inside caliper jaws each fixed to the bottom of one of said sliders, the contact surfaces of the inside and the outside jaw of each slider being in the same straight line which is at right angles to the axis of the caliper; a spindle turning freely with relation to said bar but restrained to prevent axial movement with relation thereto; a nut fixed to the left hand slider and engaging a left hand thread on the left hand end of said spindle; a jacket fixed with relation to said bar; a sleeve right handedly threaded inside said jacket and sliding loosely on the right hand end of said spindle; a sliding key connecting the right hand end of said spindle to said sleeve; a calibration tube fixed to said sleeve and projecting over said jacket; means by which said tube actuates the right hand slider; and calibration markings on said jacket and the edge of said calibration tube.

In testimony whereof, I have hereunto set my hand at Los Angeles, California, this 30th day of June, 1917.

ALFRED G. O. HIX.

Copies of this patent may be obtained for five cents each, by addressing the "Commissioner of Patents, Washington, D. C."